United States Patent [19]

Fisher

[11] Patent Number: 4,601,565
[45] Date of Patent: Jul. 22, 1986

[54] CAMERA ADAPTER DEVICE
[75] Inventor: Harrold Fisher, La Mesa, Calif.
[73] Assignee: Cubic Corporation, San Diego, Calif.
[21] Appl. No.: 683,249
[22] Filed: Dec. 18, 1984
[51] Int. Cl.[4] .............................................. G03B 17/00
[52] U.S. Cl. ...................................... 354/293; 350/319
[58] Field of Search ...................... 354/293, 79, 81, 80, 354/295, 354, 161, 75, 76, 77, 159, 245; 355/21, 39, 63, 55, 133; 350/319

[56] References Cited

U.S. PATENT DOCUMENTS

| | | | |
|---|---|---|---|
| 2,069,186 | 1/1937 | Hineline | 354/245 X |
| 2,241,300 | 9/1940 | Gale | 354/293 X |
| 2,726,586 | 12/1955 | McCain | 354/161 |
| 3,514,206 | 7/1967 | Harvey et al. | 355/67 |
| 3,601,028 | 8/1971 | Tertocha | 354/81 X |
| 3,696,720 | 10/1972 | Vinson | 354/76 X |
| 3,709,119 | 4/1971 | Van Der Meer | 354/293 |
| 3,918,810 | 11/1975 | Cohen | 355/18 |
| 4,145,138 | 3/1979 | Mercure | 355/25 |
| 4,310,231 | 1/1982 | Konishi et al. | 355/79 |

OTHER PUBLICATIONS

Photographic Equipment and Instrumentation, 64th Annual Catalog No. 261-A, Burke and James, Inc., Mar. 1961, pp. 40, 42.

Primary Examiner—L. T. Hix
Assistant Examiner—Brian W. Brown
Attorney, Agent, or Firm—Brown, Martin & Haller

[57] ABSTRACT

An adapter device for mounting a standard 33 mm camera on a copy camera of the type having an open back over which a film holder is normally mounted so that the bellows extension and lenses of the copy camera can be used for extreme close up photography with a 35 mm camera and film. The device comprises a plate for mounting over the open back of the copy camera in place of the normal film holder and an adapter for connection to a 35 mm camera rotatably mounted on the plate. The plate has dimensions the same as the normal film holder and engages in a mounting assembly on the open back of the copy camera in which the film holder is normally mounted. An opening in the plate is aligned with the copy camera lenses when the plate is mounted over the open back of the camera.

5 Claims, 4 Drawing Figures

CAMERA ADAPTER DEVICE

BACKGROUND OF THE INVENTION

The present invention relates to an adapter device for use with a copy or view type camera used for close up and copy work.

One example of a copy camera used to produce high quality close up prints is the Polaroid MP-4 copy camera. Cameras of this type employ a lens system mounted in a bellows extension for controlling magnification, and has an open back over which a special film holder is mounted in channels or slide runners on the back of the camera in order to take a photograph. A special viewer is provided to engage in the channels before mounting the film so that the work to be photographed can be aligned and the focusing and magnification of the lens systems adjusted. Thus photographs can only be taken one at a time in a fairly lengthy process involving inserting and removing the viewer followed by insertion and removal of a film holder. The camera is normally mounted on a special stand and thus is fixed in a certain position and cannot take photographs from different angles without first moving the work and realigning it with the viewer. Thus copy photography systems for close up work are normally relatively cumbersome and time consuming when a series of photographs are needed, and the special film used is relatively expensive.

SUMMARY OF THE INVENTION

It is an object of this invention to provide a device for adapting a conventional 35 mm camera for use with a copy type camera so that close up photographs can be made with conventional 35 mm film.

According to the present invention an adapter device is provided for use with a copy camera of the type having an open back with channels or runners for engaging a film holder of dimensions the same as the open back of the camera. The runners or channels normally hold a film holder in place over the open back of the camera. The adapter device comprises a plate having the same dimensions as the standard film holder for engagement with the copy camera channels or runners in place of the film holder, the plate having an opening for alignment with the copy camera lenses, and a central boss mounted on the plate having an adapter for connection to the standard 35 mm camera lens adapter. The central boss is preferably rotatably mounted on the plate to allow the camera to be orientated to the work or object to be photographed.

With this adapter device a standard 35 mm camera using standard print or slide film, or instant Polaroid slide film for instant photography, can be used for extreme close up work of the type normally done only with copy or view type cameras and special copy film. The camera to be used is first secured to the adapter so that it is aligned with the opening in the plate, and the plate is then slid along the channels or runners of a copy camera until it is in place over the open back of the camera. 35 mm photographs and slides can then be taken using the bellow extension and lenses of the copy camera.

DETAILED DESCRIPTION

Figure 1:
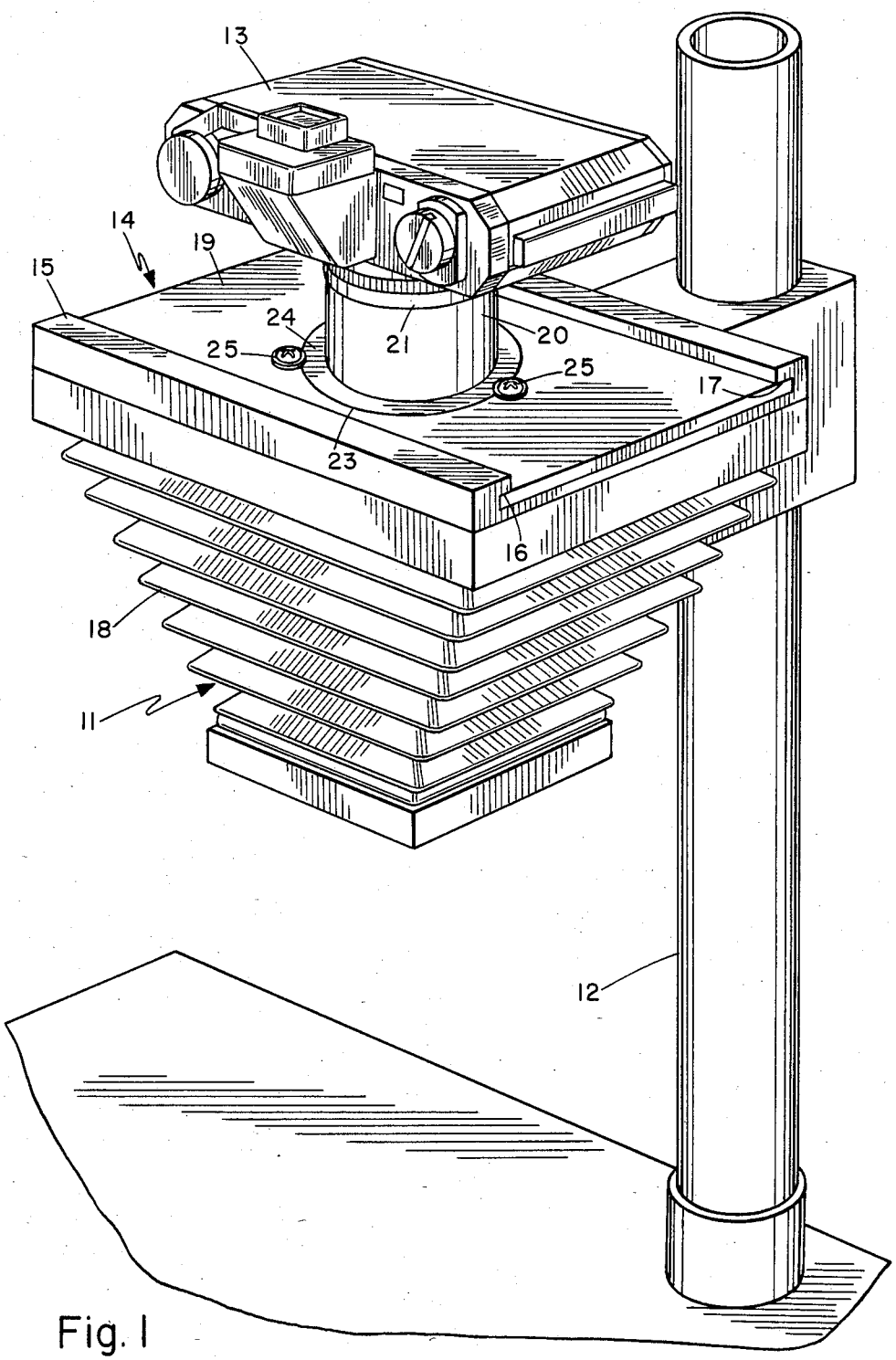
FIG. 1 is a prospective view showing a 35 mm camera mounted on a standard copy camera using the adapter device according to an exemplary embodiment of the invention.

FIG. 1 shows a copy camera 11 of the Polaroid MP-4 type or equivalent on a copy stand 12 with standard 35 mm camera 13 mounted on the back of the copy camera 11 by means of an adapter device 14 according to an exemplary embodiment of the present invention.

MP-4 and equivalent cameras have a slide assembly 15 comprising channels or runners 16 and 17 that serves as means for mounting a viewer or a film holder in place over the open back of the camera above the bellows extension 18. The adapter device 14 of this invention basically comprises a plate 19 designed to slide over the open back of the camera in place of the usual film holder. Thus the shape and dimensions of the plate are generally the same as those of the film holder so that the plate mates with the slide assembly and can be slid in place much like the film holder. In the case of a Polariod MP-4 camera, the dimensions of the film holder, and consequently plate 19, are approximately 4×5 inches (10.16×12.70 cm).

A central boss or cylindrical member 20 is rotatably mounted on the plate 19 and has an adapter ring 21 designed for connection to the lens connector of a standard 35 mm camera. The adapter ring may screw onto the end of the boss and mate with either a conventional screw-type or a bayonnet-type connector arrangement on the 35 mm camera.

Figure 2:
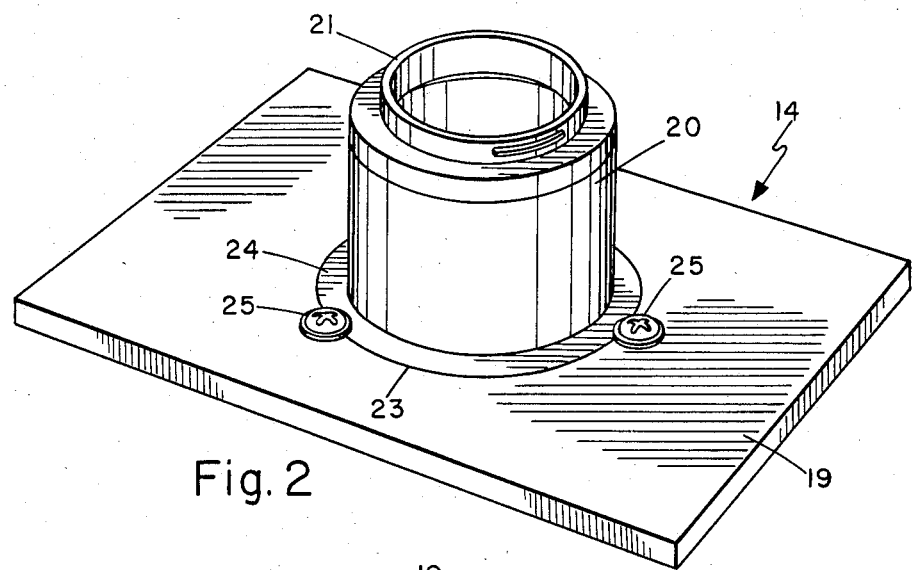
FIG. 2 is a perspective view showing the adapter device alone.
Figure 3:
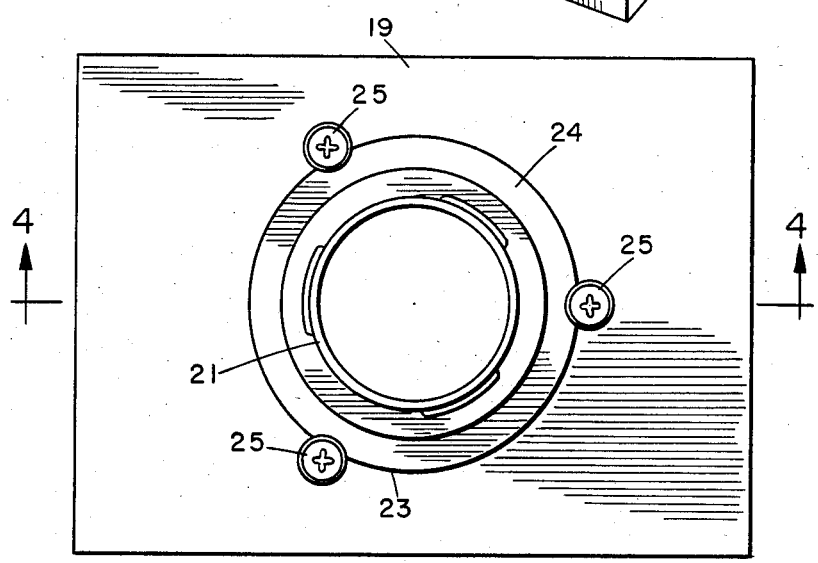
FIG. 3 is a top plan view of the device.
Figure 4:
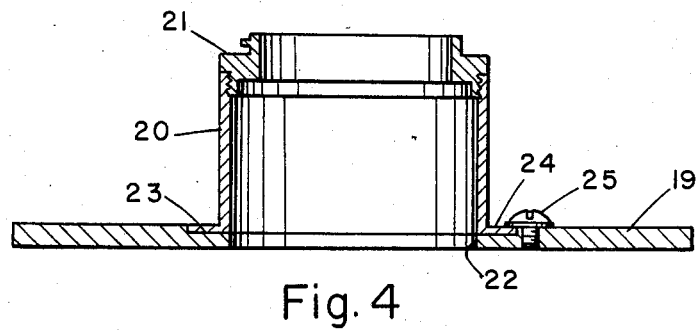
FIG. 4 is a vertical cross section through the adapter device on the lines 4—4 of FIG. 3.

The adapter device 14 is shown in more detail in FIGS. 2 to 4. The plate has a central opening 22 with an annular recess 23 around the opening in the upper face of the plate. The boss 20 has a through bore and a flange 24 around its lower edge which engages in the recess 23. Screws 25 around the periphery of the recess retain the flange in place. Thus the boss 20 can be rotated relative to the plate 19. The adapter ring in the upper end of the boss is of a standard type found on 35 mm lenses so that the device 14 can be connected to any standard 35 mm camera in place of the normal interchangeable lenses. The adapter ring may be of the screw thread type or bayonet type, for example, and separate devices 14 having different adapter rings for connection to 35 mm cameras with different types of lens connectors may be provided.

To use the adapter device 14, a standard 35 mm camera with any desired standard 35 mm print, slide, or Polaroid slide film is secured to the adapter device via adapter ring 21. The plate 19 is then slid in place along the runners or channels 16 and 17 across the open back of the camera 11 until it locks in place in the same way as the normal film holder. At this point the central opening 22 and 35 mm camera 13 will be aligned with the copy camera lenses. The boss and 35 mm camera can then be rotated if necessary to orientate the camera to the work to be photographed.

At this point photographs can be taken using the viewing and monitoring apparatus of the 35 mm camera and the bellows and lenses of the copy camera. Thus a standard 35 mm can be employed for extreme close up work, and any desired 35 mm print, slide, or Polaroid slide film can be used. Such film is inexpensive when compared to the normal copy camera film. Any 35 mm camera may be mounted on the adapter device.

With this device a series of close up shots of an object can be taken quickly and easily, using relatively inexpensive 35 mm film. Shots from various different angles can be taken simply by rotating the camera on the plate, without having to move the object or readjust the lenses.

Thus the adapter device described above can be used with any copy camera of the type having an open back with some assembly for locking a film holder over the open back. The plate of the adapter device is substituted for the standard film holder normally placed over the open back. In addition, the device may be used on any studio/view camera with same type back designed to accept a 4×5 film holder. By changing the size of the adapter (plate 19), the device can be used with other size cameras.

Although an exemplary embodiment of the invention has been described by way of example, it will be understood by those skilled in the field that modifications can be made to the disclosed example without departing from the scope of the invention, which is defined by the appended claims.

What is claimed is:

1. An adapter device for use with a copy camera of the type having an open back and guide means for mounting a film holder over the camera back, the device comprising:
    a plate for securing to the back of the copy camera in place of the film holder, the plate being shaped and dimensioned to make with the film holder guide means and cover the open back of the camera and having an opening for alignment with the copy camera lenses;
    adapter means rotatably mounted on the plate in alignment with the opening, the adapter means including projecting connector means for releasably securing a 35 mm camera to the plate in alignment with the plate opening; and
    releasable securing means for releasably securing the adapter means and connected 35 mm camera in any chosen rotated position relative to the copy camera.

2. The device as claimed in claim 1, wherein the plate is a 4×5 (10.15×12.70 cm) inch plate.

3. The device as claimed in claim 1, wherein the adapter means comprises a cylindrical boss having a through bore and a flange around its lower edge rotatably mounted on the upper face of the plate, the boss having an adapter ring at its upper end comprising means for connection to the lens connector of a 35 mm camera.

4. The device as claimed in claim 3, wherein the plate has an annular recess surrounding the opening dimensioned to rotatably receive said flange with the upper face of the flange and plate substantially flush with one another, and said releasable securing means comprises screw means for screwing into the plate and engaging over the upper face of the flange to secure said adapter means to the plate.

5. A copy camera assembly, comprising;
    a copy camera having a lens assembly, an open back and guide means for removably mounting a film holder across the open back of the camera;
    an adapter device comprising a plate having the same dimensions and shape as a film holder, the plate being mounted across the open back of the camera via said guide means and having a central opening in alignment with the copy camera lens assembly, and a connector device rotatably mounted on said plate in alignment with said opening, the connector device having an upwardly projecting adapter ring aligned with said opening for connection to a 35 mm camera lens connector; and
    a 35 mm camera secured to said adapter ring.

* * * * *